United States Patent [19]

Hougaard

[11] Patent Number: 4,984,014
[45] Date of Patent: Jan. 8, 1991

[54] REPRODUCTION CAMERA COMPRISING A SCANNING LIGHT SOURCE

[75] Inventor: Finn Hougaard, Copenhagen, Denmark

[73] Assignee: Eskofot A/S, Ballerup, Denmark

[21] Appl. No.: 450,075

[22] Filed: Dec. 13, 1989

[30] Foreign Application Priority Data

Dec. 16, 1988 [DK] Denmark .................. 7000/88

[51] Int. Cl.$^5$ .................................. G03B 27/54
[52] U.S. Cl. ........................................ 355/67
[58] Field of Search .................. 355/67, 70, 84

[56] References Cited

U.S. PATENT DOCUMENTS 4,258,396 3/1981 Scott ........................ 355/67 X
4,493,551 1/1985 Fine et al. ................. 355/67 X

FOREIGN PATENT DOCUMENTS 2040431 12/1979 United Kingdom .

Primary Examiner—Richard A. Wintercorn
Attorney, Agent, or Firm—Cushman, Darby & Cushman

[57] ABSTRACT

A reproduction camera comprising a picture plane, an original plane and an objective plane, whereby the original plane is exposed by means of at least one elongated light source preferably situated below said original plane and optionally scanning at a varying velocity. The light source is turned during the scanning procedure in such a manner that it is directed towards the objective. Preferably, the elongated light source situated below the original plane comprises at least one reflector, at least a portion of said reflector being turnable during the scanning procedure in such a manner that the light reflected is always directed towards the objective. As a result a better utilization of the light is obtained. Preferably, the reflector is shaped in such a manner that a uniform beam is obtained within a predetermined angle, whereby the light source need not be turned during the scanning procedure.

9 Claims, 5 Drawing Sheets transmission light in connection
with a diffusion plate transmission light in connection
with a turnable light source transmission light in connection
with a restricted angle of light

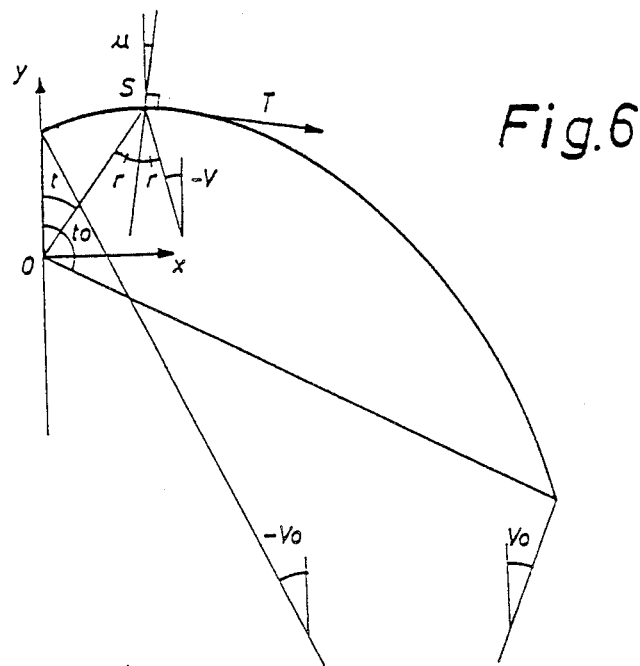
Fig.6
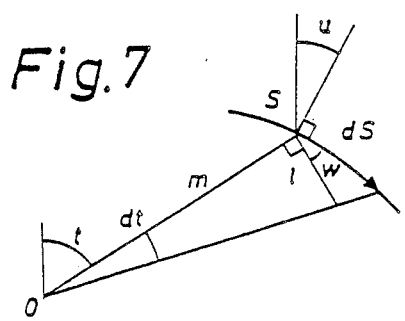
Fig.7
Fig.8
$dv/dt < 0:$   $dv/dt > 0:$
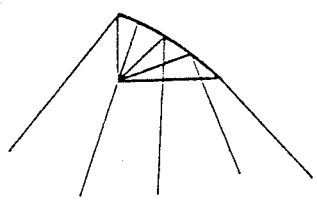 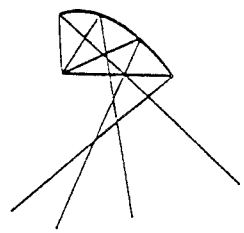

REPRODUCTION CAMERA COMPRISING A SCANNING LIGHT SOURCE

FIELD OF THE INVENTION

The invention relates to a reproduction camera comprising plane, whereby the original plane is exposed by means of at least one elongated scanning light source preferably situated below said original plane and optionally scanning at a varying velocity.

BACKGROUND ART

A diffusion plate is usually mounted between the light sources such as a plurality of fluorescent tubes, and the original, cf. FIG. 2, in a reproduction camera operating with transmission light. Such a diffusion plate involves shaping of a mixture chamber as some of the light is reflected from said diffusion plate. Subsequently, the reflector situated below the light source reflects the light towards the diffusion plate etc. As a result the light is distributed more or less uniformly between and above the light sources. Without the diffusion plate and the reflector below the light sources it is completely dark between the light sources when seen from the objective. The diffusion plates are encumbered with two drawbacks, viz. much light is absorbed during the passage of said plates. An absorption of about 50% has been measured. Furthermore the light is hemispherically diffused above the plate. As a result only a reduced portion of the light is directed towards the objective.

Furthermore U.S. patent application Ser. No. 2,487,066 discloses a reproduction situated above the objective, said camera, however, being encumbered with the drawback that only a very reduced portion of the light is directed towards the objective.

SUMMARY OF THE INVENTION

The object of the present invention is to demonstrate how it is possible to increase the utilization of the light, and the reproduction camera according to the invention is characterised in that during the scanning procedure the light source is turned in such a manner that it is always directed towards the objective. According to a particularly advantageous embodiment the elongated light source situated below the objective comprises at least one reflector, at least a portion of said reflector being turnable during the scanning procedure in such a manner that the reflected light is always directed towards the objective. As a result the utilization of the light has been substantially increased.

According to a particularly advantageous embodiment the turnable portion of the reflector is controlled by a servo-system in response to the focal length and the magnification, whereby a reproduction camera is obtained which is more flexible than previously known.

BRIEF DESCRIPTION OF THE DRAWINGS

The invention is described in greater detail below with reference to the accompanying drawings, in which

FIGS. 6-8 illustrate how the shaping of the reflector is calculated, and

DESCRIPTION OF PREFERRED EMBODIMENTS

Figure 1:
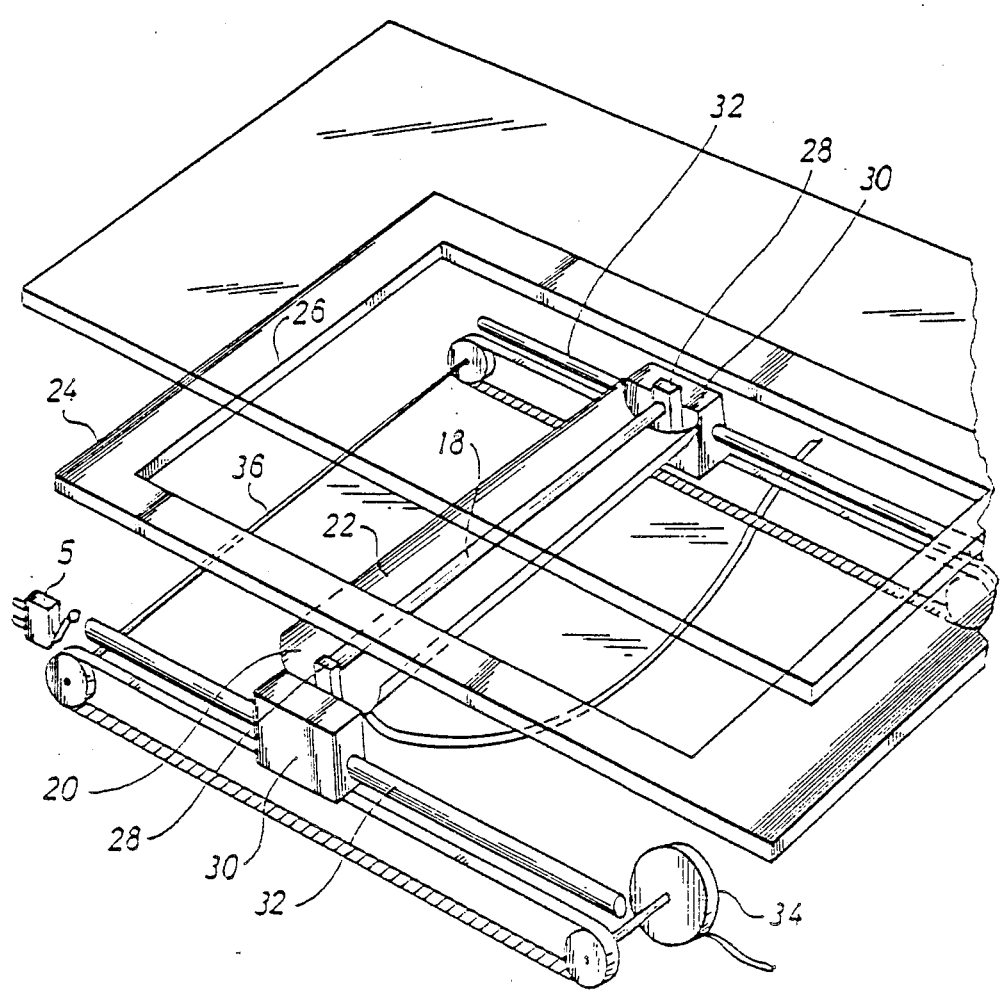
FIG. 1 is an exploded view of an original table of a reproduction camera according to the invention, said original table being subjected to exposure from the bottom.
Figure 5:
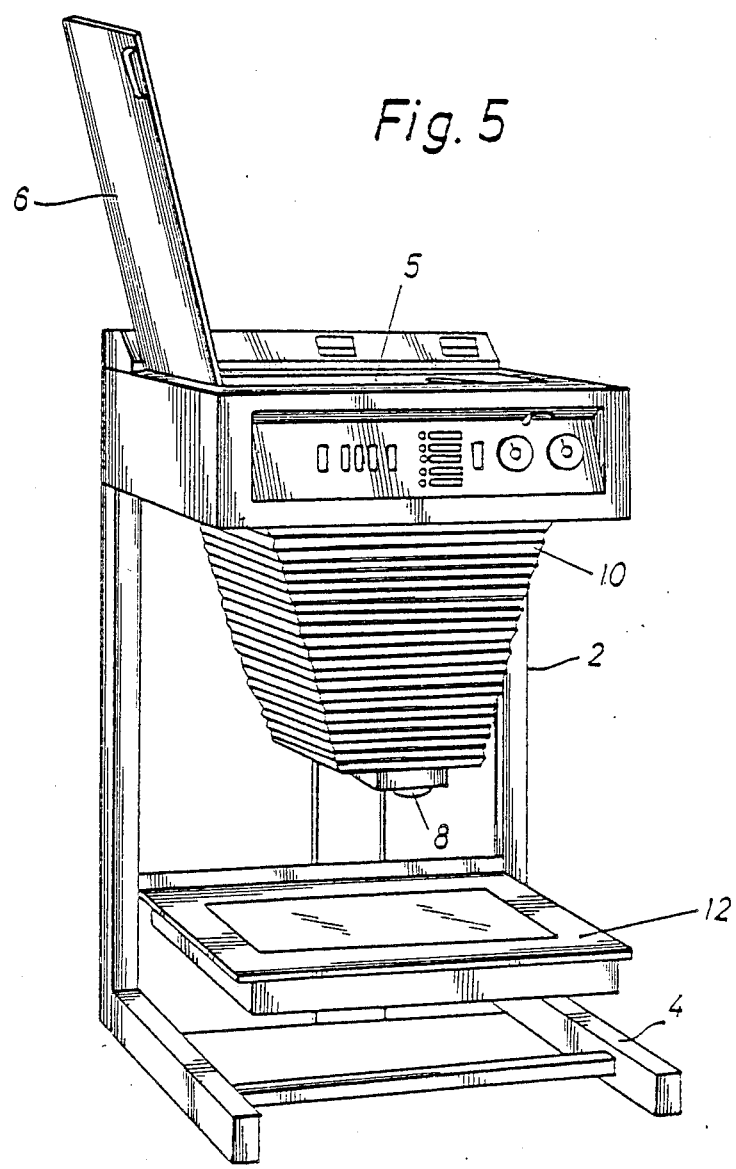
FIG. 5 illustrates the entire reproduction camera.

FIG. 1 illustrates the original table of a reproduction camera, cf. FIG. 5, said table comprising a frame 2 supported by a foot 4. The top of the frame 2 carries a permanent table with a glass plate 5, on which a sheet of light-sensitive material can be placed. A lid 6 can be placed on the glass plate 5 so as to keep the sheet in position. A photographic objective 8 is carried by an up-and 12 is situated below the objective 8. The original table 12 carries a glass plate, on which the original can be placed, cf. FIG. 5.

Figure 2:
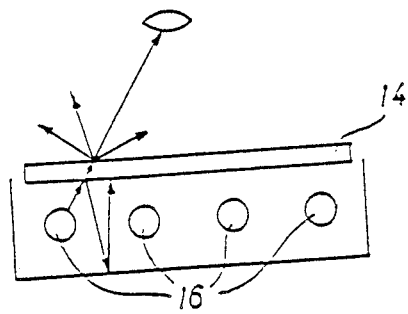
FIG. 2 illustrates an original table subjected to exposure from the bottom by means of a plurality of fixed fluorescent tubes.
Figure 2:
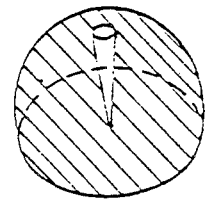

A diffusion plate 14 is usually mounted between the light sources 16, such as a plurality of fluorescent tubes, and the original, cf. FIG. 2, in a reproduction camera operating with transmission light. Such a diffusion plate involves shaping of a mixture chamber as some of the light is reflected back from said diffusion plate 14. Subsequently, the reflector situated below the light source reflects the light back towards the diffusion plate 14 etc. As a result the light is distributed more or less uniformly between and above the light sources 16. If the diffusion plate and the reflector are not present below the light sources, it is when seen from the objective completely dark between the light sources.

The diffusion plate 14 is encumbered with two drawbacks, viz. much light is absorbed during the passage of said plates, and in practise a loss of absorption of about 50% has been measured. Furthermore the light is hemispherically diffused above the plate with the result that only a very reduced portion of the light is directed towards the objective. When the light is hemispherically and uniformly diffused, the coefficient of utilization can be calculated.

The area of the focal aperture is $$A1 = \pi(f/2B)^2$$

where f represents the diaphram width and B the diaphram number of the objective.

(Diaphram number = focal width/diaphram diameter)

The area of the hemisphere is $$A2 = 2\pi((1+1/m) \times f)^2$$

where m represents the magnification of the objective.

Accordingly the coefficient of utilization is $$n1 = (1 - 50\%) \cdot \frac{A1}{A2} = \frac{\pi f^2}{8b^2 \cdot 2\pi\left(\left(1 + \frac{1}{m}\right)f\right)^2} =$$

$$\frac{1}{16\left(b\left(1+\frac{1}{m}\right)\right)^2}$$

A magnification of 100% and a diaphram number of 11 result in a coefficient of utilization of $$n1 = \frac{1}{16\cdot\left(11\left(1+\frac{1}{1}\right)\right)^2} = 0{,}00013$$

If the angle defining the emission of light can be restricted simultaneously with the light being directed towards the objective, it is possible to improve the coefficient of utilization to a substantial degree. A structure allowing such a restriction of the angle may comprise an original holder including two transparent plates, i.e. no diffusion plate, an elongated, movable light source 18, a reflector 20 ensuring that the rays of light are substantially the light source 18, such as for instance a parabolic reflector, and a servo-mechanism turning the light source and the reflector in such a manner that the rays of light are always directed towards the objective during the scanning procedure, cf. FIG. 3.

The turning angle is $$D = Arc\ tan\ (a/(1+1/m)\cdot f)$$

where x represents the distance of the light source 18 from the optical axis.

The coefficient of utilization of such a system can now be calculated, the area of the focal aperture still being $$A1 = \pi\cdot(f/2B)^2$$

Figure 3:
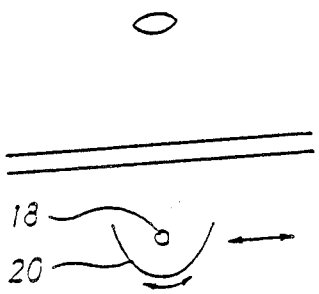
FIG. 3 illustrates an original table subjected to exposure from the bottom by means of a scanning light source in form of a fluorescent tube with a reflector.
Figure 3:
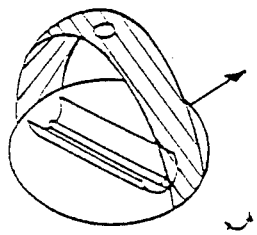
Figure 4:
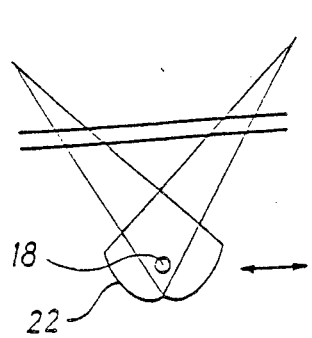
FIG. 4 illustrates an original table subjected to exposure from the bottom. whereby the reflector of the scanning light source is shaped in a particularly advantageous manner.
Figure 4:
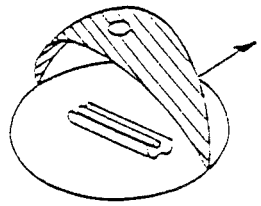

Now the light is not hemispherically diffused, but describes a strip of the surface of a ball, cf. FIG. 3. When the reflector 20 is a parabolic reflector, the area of the ball strip is $$A2 = \times radius\ width = \times 2(1+1/m)f\cdot P$$

where P represents the width of the parabolic reflector.

As a result the coefficient of utilization is $$n2 = \frac{A1}{A2} = \frac{\pi\cdot\left(\frac{f}{2B}\right)^2}{\pi\cdot 2\left(1+\frac{1}{m}\right)f\cdot P} = \frac{f}{8\left(1+\frac{1}{m}\right)\cdot P\cdot B^2}$$

A magnification of 100%, a diaphram number of 11, a focal width of 270 mm and a parabolic width of 100 mm result in $$n2 = \frac{270}{8\left(1+\frac{1}{1}\right)\cdot 100\cdot 11^2} = 0{,}0014$$

which is an improvement of about 10 times.

Another embodiment of the structure comprises a reflector corresponding to the visual angle of the optical instruments instead of a reflector providing a parallel beam of rays, as well as a turning mechanism for the reflector.

The coefficient of utilization is then calculated with a focal aperture of $$A1 = \pi\cdot(f/2B)^2$$

Here the light is diffused over a portion of a hemisphere corresponding to the shell of a piece of melon of an area of $$A2 = 2\pi((1+/m)f)^2\cdot V/180$$

where $V = 2\ Arc\ tan\ (x/(2(1+1/m)\cdot f))$ where V represents the visual angle interval from the optical instruments to the centre of the light source, and X represents the width of the original.

Then the coefficient of utilization is $$n3 = \frac{A1}{A2} = \frac{\pi(f/(2B))^2\cdot 180}{2\pi\left(\left(1+\frac{1}{m}\right)f\right)^2\cdot V} = \frac{180}{8V\left(B\left(1+\frac{1}{m}\right)\right)^2}$$

A magnification of 100%, a diaphram number of 11, a focal width of 270 mm and an original width of 700 mm result in $$V = 2\ Arc\ tan(700/(2(1+1/1)\cdot 270)) = 65{,}9$$

$$n3 = \frac{180}{8\cdot 65{,}9\left(11\cdot\left(1+\frac{1}{1}\right)\right)^2} = 0{,}00071$$

corresponding to an improvement of about 5 times compared to the diffusion plate.

The above reflector need not be turnable.

The shape of the reflector is determined in the following manner. The object is to develop a reflector emitting light uniformly diffused within a predetermined angular interval. FIG. 6 illustrates half a reflector utilizing the light in the range $0 < t < t0$. The light is reflected in the range $-v_0 < v < v_0$. The other half of the reflector is a mirror picture of the first half portion of the reflector in the Y-axis.

The principle is that one and only one angle V corresponds to an angle t. i.e. V is a monotonic function of t (continuously and with a differential coefficient with the same signs throughout the range). Furthermore the chosen differential coefficient is positive whereby the light source does not shade the reflecting light rays, cf. FIG. 8.

In order to obtain a uniform distribution of light, the differential coefficient dv/dt must be constant = $k_1 \rightarrow$ $$v = k_1\times t + k_2$$

$$-v_0 = K_1\times 0 + k_2\ and$$

$$v_0 = k_1\times t_0 + k_2 \rightarrow$$

$$k_2 = -v_0 \rightarrow$$

$$k_1 = (v_0 - k_2)/t_0 = 2v_0/t_0$$

The tangent T for the reflector in a point S is found $$2r = t - v\ and\ u = t - r \rightarrow$$

$r = (t-v)/2 \rightarrow$ $u = t - (t-v)/2 = (t+v)/2$ $T = (\cos u, -\sin u$

The differential of the point S in relation to t is found, cf. FIG. 7

$S = (x, y)$ $m = \sqrt{x^2 + y^2}$ $1 = m \times dt$ $= t - u = t - (t+v)/2 = (t-v)/2$ $dS = T \cdot 1/\cos w = T \cdot m \cdot dt/\cos w$ $dx/dt = \cos u \cdot m/\cos w$ $= \cos ((t+v)/2) \cdot \sqrt{x^2 + y^2}/\cos((t-v)/2)$ and $dy/dt = -\sin u \cdot m/\cos w$ $= -\sin ((t+v)/2) \cdot \sqrt{x^2 + y^2}/\cos((t-v)/2).$ Subsequently the reflector is determined by integrating the above with suitable starting conditions, such as $S = (O, a)$ at $t = 0.$ x and y are, however, found to the right of the equations, whereby an iteration is easily performed.

$t_i = t_{i-1} + dt$ $v_i = k_1 \cdot t_i + k_2$ $x_i \rho x_{i-1} + dt \cos((t_i + v_i)/2) \sqrt{x^2_{i-1} + y^2_{i-1}/\cos((t_i - v_i)/2)}$ $y_i \rho y_{i-1} - dt \sin((t_i + v_i)/2 \sqrt{x_{i-1}2 + y_{i-1}2/\cos((t_i - v_i)/2}$ The iteration starts with $t_i = 0$ and ends when $t_i > t_0$, dt is chosen in such a way that a suitable specific result is obtained, such as $t_0/100$.

Figure 9:
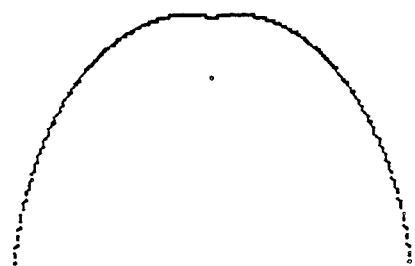
FIG. 9 illustrates the final reflector

FIG. 9 illustrates a reflector determined according to the above principle. Various magnifications and focal widths provide as far as the three methods are concerned the following results:

| m | f | n1 % | n2 % | n3 % | n2/n1 | n3/n1 |
|---|---|------|------|------|-------|-------|
| 0, 2 | 150 | 0, 0014 | 0, 026 | 0, 008 | 18 | 5, 5 |
| 0, 3 | 150 | 0, 003 | 0, 036 | 0, 015 | 13 | 5, 5 |
| 0, 5 | 240 | 0, 006 | 0, 083 | 0, 031 | 14 | 5, 5 |
| 1 | 270 | 0, 013 | 0, 14 | 0, 071 | 11 | 5, 5 |
| 2 | 240 | 0, 023 | 0, 17 | 0, 13 | 7, 2 | 5, 5 |
| 3 | 150 | 0, 029 | 0, 12 | 0, 16 | 4, 0 | 5, 5 |
| 5 | 150 | 0, 036 | 0, 13 | 0, 28 | 3, 6 | 5, 5 |

It appears that the last method has proved to be the most efficient method in connection with magnifications. As the exposure periods are unacceptably long at magnifications the last method is the most preferred method.

The original table of FIG. 1 is a glass plate 24 on which the original 26 can be placed. An elongated light source 18 in form of a fluorescent tube or a halogen lamp is present below the glass plate 24. The fluorescent tube is secured to a base 28 at both ends, said base in turn being secured to a vehicle 30 displaceable in the longitudinal direction along a guide 32. Below and on both sides of the vehicle 30, a belt or chain is provided. The belt or chain is connected to the vehicle and is driven by a motor 34 in one side of the original plane via a first belt pulley or a first chain wheel. The first belt pulley or the first chain wheel is situated at one end of the guide 32 to the left thereof. The belt or the chain extends around a second belt pulley or chain wheel at the opposite end of the guide 32, the latter belt pulley or chain wheel in turn being connected via a transverse shaft 36 to a third belt pulley or chain wheel at the opposite side of the original table. The third belt pulley or chain wheel is situated at the end of a guide 32 in the right side of the original table and is connected to a fourth belt pulley or chain wheel via a belt or a chain.

A reflector is provided below the light source 18. said reflector being turnable during the scanning procedure in response to the desired magnification and focal width. The turning is carried out by means of a pulse-controlled electromotor preferably mounted in one of the vehicles. The angular position is measured by means of an angle measuring device preferably mounted in the other vehicle. When the angle deviates from the desired angular position, an error signal is delivered, said signal being used as a negative feedback in such a manner that the instant value is automatically adjusted to the desired value.

The scanning may optionally be carried out at a varying velocity so as to compensate for an uneven exposure in the picture plane. The scanning velocity may optionally vary inversely as $\cos^4 D$, whereby a substantially uniform exposure in the entire picture plane is obtained According to an alternative embodiment the scanning light source is situated above the original table, whereby a reflector is provided which ensures that the light is directed towards the original table and not directly upwards towards the objective.

According to the present invention it has thus been illustrated how it is possible to utilize the light in a far more efficient manner than previously known.

I claim:

1. A reproduction camera comprising a picture plane, an original plane and an objective plane, whereby the original plane is exposed by means of at least one elongated scanning light source preferably situated below said original plane and optionally scanning at a varying velocity, wherein the light source is turned during the scanning procedure in such a manner that it is directed towards the objective.

2. A reproduction camera as in claim 1, wherein the elongated light source comprises at least one reflector, at least a portion of said reflector being turnable during the scanning procedure in such a manner that the reflecting light is directed towards the objective.

3. A reproduction camera as in claim 2, wherein the turnable portion of the reflector is controlled by a servosystem in response to the focal length and the magnification.

4. A reproduction camera as in claim 3 wherein the turning angle is determined according to the formula $D = Arc \, tan(x/(1 + 1/m) \cdot f))$ by means of a computer, where D represents the angle from the light source to the objective relative to the optical axis.

5. A reproduction camera as in claim 1, wherein the scanning velocity varies inversely as $\cos^4 D$ 6. A reproduction camera as in claim 1 wherein the elongated light source is a halogen lamp.

7. A reproduction camera as in claim 1, wherein the elongated light source is a fluorescent tube.

8. A reproduction camera as in claim 1, wherein the light intensity is varied during the scanning procedure.

9. A reproduction camera as in claim 3 wherein the servo-system is controlled by the computer of the reproduction camera, said computer calculating the angular position of the light source according to the formula $$D = Arc\ tan(x/(1+1/m)\cdot f)).$$

* * * * *